US007336836B2

(12) United States Patent
Mitchell et al.

(10) Patent No.: US 7,336,836 B2
(45) Date of Patent: Feb. 26, 2008

(54) METHOD, SYSTEM, AND PROGRAM PRODUCT FOR ERROR RECOVERY WHILE TRANSMITTING AND DECODING COMPRESSED DATA

(75) Inventors: Joan La Verne Mitchell, Longmont, CO (US); Nenad Rijavec, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 10/909,726

(22) Filed: Aug. 2, 2004

(65) Prior Publication Data

US 2005/0002579 A1    Jan. 6, 2005

Related U.S. Application Data

(60) Division of application No. 10/063,424, filed on Apr. 23, 2002, now Pat. No. 7,224,840, which is a continuation-in-part of application No. 09/697,544, filed on Oct. 26, 2000, now Pat. No. 6,690,832.

(51) Int. Cl.
*G06K 9/36* (2006.01)
(52) U.S. Cl. .................................................... 382/233
(58) Field of Classification Search ........ 382/232–253; 341/59, 67, 65, 104; 375/240–240.26
See application file for complete search history.

(56) References Cited

U.S. PATENT DOCUMENTS 5,371,841 A    12/1994 Jones
5,442,458 A    8/1995    Rabbani et al.
5,483,287 A    1/1996    Siracusa
5,586,285 A    12/1996   Hasbun et al.
5,717,394 A    2/1998    Schwartz et al.
5,881,173 A    3/1999    Ohmori
5,903,382 A    5/1999    Tench et al.
6,009,203 A    12/1999   Liu et al.
6,381,371 B1 *  4/2002    Epstein et al. .............. 382/246
6,385,341 B1    5/2002    Lisitsa et al.

(Continued)

OTHER PUBLICATIONS

U.S. Appl. No. 10/909,723, entitled "Method, System & Program Product of Error Recovery While Decoding Cached Compressed Data", filed Aug. 2, 2004 by inventors J.L. Mitchell and N. Rijavec.

(Continued)

*Primary Examiner*—Ishrat Sherali
(74) *Attorney, Agent, or Firm*—David W. Victor; Konrad Raynes & Victor LLP

(57) ABSTRACT

A method, system, and program for transmitting and decoding compressed data. Compressed data is received and decoded. An error is detected while decoding a first location in the compressed data. A reentry data set is accessed having a pointer to a second location in the compressed data following the first location and decoding information that enables decoding to start from the second location. The second location in the compressed data is accessed and the decoding information in the accessed reentry data set is used to continue decoding the compressed data from the second location.

7 Claims, 14 Drawing Sheets

U.S. PATENT DOCUMENTS

| | | |
|---|---|---|
| 6,591,013 B1 | 7/2003 | Taunton |
| 6,690,832 B1 | 2/2004 | Mitchell et al. |
| 6,819,803 B2 | 11/2004 | Mitchell et al. |
| 6,879,725 B2 | 4/2005 | Rijavec et al. |
| 6,941,019 B1 | 9/2005 | Mitchell et al. |
| 7,146,053 B1 | 12/2006 | Rijavec et al. |

OTHER PUBLICATIONS

U.S. Appl. No. 11/151,864, entitled "Method, System & Program for Error Recovery While Decoding Compressed Data", filed Jun. 13, 2005 by inventors J.L. Mitchell and N. Rijavec.

* cited by examiner

METHOD, SYSTEM, AND PROGRAM PRODUCT FOR ERROR RECOVERY WHILE TRANSMITTING AND DECODING COMPRESSED DATA

RELATED APPLICATIONS

This patent application is a division from a and commonly assigned patent application Ser. No. 10/063,424, filed on Apr. 23, 2002 and now the U.S. Pat. No. 7,224,840 which is in turn a continuation-in-part of a and commonly assigned patent application entitled "Method, System, and Program for Decoding Compressed Data at Multiple Points", filed under U.S. application Ser. No. 09/697,544 on Oct. 26, 2000 and now U.S. Pat. No. 6,690,832 issued Feb. 10, 2004.

BACKGROUND OF THE INVENTION

1. Field of the Invention

The present invention relates to a method, system and program for error recovery while decoding compressed data.

2. Description of the Related Art

Digital images may use one or more bits to describe the color intensity at each pixel. The term "pixel" as used herein refers to one or more intensity inputs or bit values at a data point that represents data to be rendered (i.e., printed, displayed, etc.), where the data to be rendered may include, but is not limited to, images, text, composite images, graphs, collages, scientific data, video, etc. A pel is a picture element point that may be expressed with one bit. If only one bit is used to express the intensity, then the image is a bilevel image where there are two possible intensity values per pixel, such as black and white or full saturation and no intensity. Digital monochrome images that allow for more than two intensities per pixel express the intensities as shades of grey.

Most systems compress image data before transmitting the data to an output device, such as a printer or display, that renders the image data. The output device must decode or decompress the compressed image to output to print or otherwise render. Compressed images may also be archived and then at some later time transmitted to an output device for decompression and rendering, e.g., printing or displaying. For instance, an Adaptive Bi-Level Image Compression (ABIC) algorithm of the prior art would sequentially encode each bit of image data by using the seven nearest neighbor bits and a probability distribution that is calculated based on previously coded data. In current implementations, the ABIC decoder maintains a history group of bits comprising the last N+2 decoded bits. In certain current implementations, the ABIC decoder uses seven of the bits, including the last two decoded bits and bits in the history range from the (N−2) bit to the (N+2) bit. These are the seven nearest bits in the raster image. Details of using the ABIC algorithm to encode and decode data are described in the IBM publication entitled "A Multi-Purpose VLSI Chip for Adaptive Data Compression of Bilevel Images", by R. B. Arps, T. K. Truong, D. J. Lu, R. C. Pasco, and T. D. Friedman, IBM J. Res. Develop., Vol. 32, No. 6, pgs. 775-795 (November 1988) and the commonly assigned U.S. Pat. No. 4,905,297, which publication and patent are incorporated herein by reference in their entirety.

If an error is encountered, the data used by the decoder to decompress the compressed data, including neighbor bits and a probability distribution, may be corrupted. To recover from an error, the decoder must begin decoding from a beginning point, such as the beginning of the current image being decompressed. Prior art encoding schemes also encode resynchronization data into the data stream to allow for decoding to begin at a resynchronization point. For instance, the compression schemes for Group 3 facsimile machines, including Modified Huffman (G3 MH) and Modified READ (G3 MR), which were finalized in the CCITT Study Group XIV in the late 1970s, encode end-of-line (EOL) codes into the data to allow resynchronization from the one-dimensional EOL points.

The G3 MH scheme independently codes horizontal runs of black or white pels alternated across a page. Every compressed line of the black/white facsimile image ended with an unique end-of-line (EOL) code consisting of at least 10 (or eleven) zeros followed by a one. No valid combination of run codes generated more than nine (or ten) zeros in a row. This EOL code allows for resynchronization after every compressed line. The two-dimensional G3 MR algorithm encodes each line with an EOL code followed by a tag bit specifying whether the next line was coded in one or two dimensions.

These early Group 3 digital facsimile machines had no error correction. The receiver could not request a retransmission. The receiver could resynchronize and recover from errors at the next one-dimensionally coded line. Because the standard size facsimile page had 1728 pels/line (i.e. 216 bytes/line) this synchronization occurred quite frequently. Further, there is no standardized technique for handling incorrect lines. Some machines print the bad data generating streaks across the page. Other machines skip the erroneous lines and output squished lines of text. Still other machines replicate the previous line in order to maintain consistent character height.

The CCITT Group 4 digital facsimile machines developed in the 1980s utilized the Modified Modified READ (G4 MMR) data compression algorithm. Instead of periodically coding lines one-dimensionally, the G3 two-dimensional coding scheme is used on every line without any EOLs. Since these machines were designed for use on the digital data networks, the transmission was expected to be error-free so error recovery resynchronization codes are not encoded into the data during compression.

The Joint Photographic Experts Group (JPEG) international data compression standard designed for continuous-tone (contone) pictures provides for optional resynchronization codes that may be encoded into the data. These resynchronization codes are defined as Restart Markers (RSTm 0XFFD0-0xFFD7) and can be used to separate independently c Define Restart Interval (DRI 0xFFDD) marker specifies how many blocks are coded between Restart Markers. If Restart Markers are not encoded into the data, then decoding must restart at the beginning of the JPEG image, from the Start of Scan marker.

Thus, with all the above techniques, resynchronization codes are encoded into the actual compressed data to allow for error recovery while decoding at a point within the compressed data. Notwithstanding, there is a continued need in the art for improved techniques for allowing for error recovery during digital data transmissions.

SUMMARY OF THE PREFERRED EMBODIMENTS

Provided are a method, system, and program for decoding compressed data. Compressed data is received and decoded. An error is detected while decoding a first location in the compressed data. A reentry data set is accessed having a pointer to a second location in the compressed data following the first location and decoding information that enables decoding to start from the second location. The second location in the compressed data is accessed and the decoding information in the accessed reentry data set to continue decoding the compressed data from the second location.

In further implementations, the compressed data is transmitted over a network from a transmitting system. In such case, a request may be sent to the transmitting system for a retransmission of compressed data including the first location after detecting the error. A block of the compressed data starting at a third location in the compressed data is received, wherein the pointer in one reentry data set addresses the third location, and wherein the block of the compressed data includes the first location. The decoding information in the reentry data set having the pointer to the third location is used to decode the block of the compressed data including the first location.

Further provided are a method, system, and program for caching data. Compressed data and reentry data sets are loaded into cache from a non-volatile storage device, wherein each reentry data set has a pointer to one location in the compressed data and decoding information that enables decoding to start from that location. A request for decoded data is received, such that the cached data includes the compressed requested data. The uncompressed data is returned from the cache by decoding only parts of the cache, accessed via the reentry data sets, that correspond to the requested data.

In further implementations, if the requested data is not in uncompressed format in the cache, then a determination is made of a first location in the compressed data whose decoded output comprises the requested data. A determination is made of a reentry data set whose pointer addresses a second location in the compressed data preceding the first location. The decoding information in the determined reentry data set is used to decode the compressed data from the second location through the first location to output the requested data in uncompressed format. The requested data is returned in the uncompressed format.

Yet further provided are a method, system, and program for transmitting data in a compressed format. Compressed data is transmitted to a receiving device. A reentry data set is also transmitted to the receiving device. The reentry data set has a pointer to a location in the compressed data and decoding information that enables decoding to start from the second location, wherein the receiving device is capable of using the decoding information in the reentry data set to decode the compressed data from the location addressed by the pointer in the reentry data set.

In certain implementations, in the event of a transmission error, the receiving device can resume decoding with the next reentry point after the error in the data. If the receiving device can ask for retransmission of the corrupted data, only the data in the corrupted reentry segment(s) need be retransmitted.

The described implementations provide a technique for decoding compressed data using reentry data sets to allow decoding to begin from one or more locations within the compressed data without having to start decoding from the beginning of the compressed data. These implementations may be used for data recovery to skip a location in the compressed data having corrupt data.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1A:
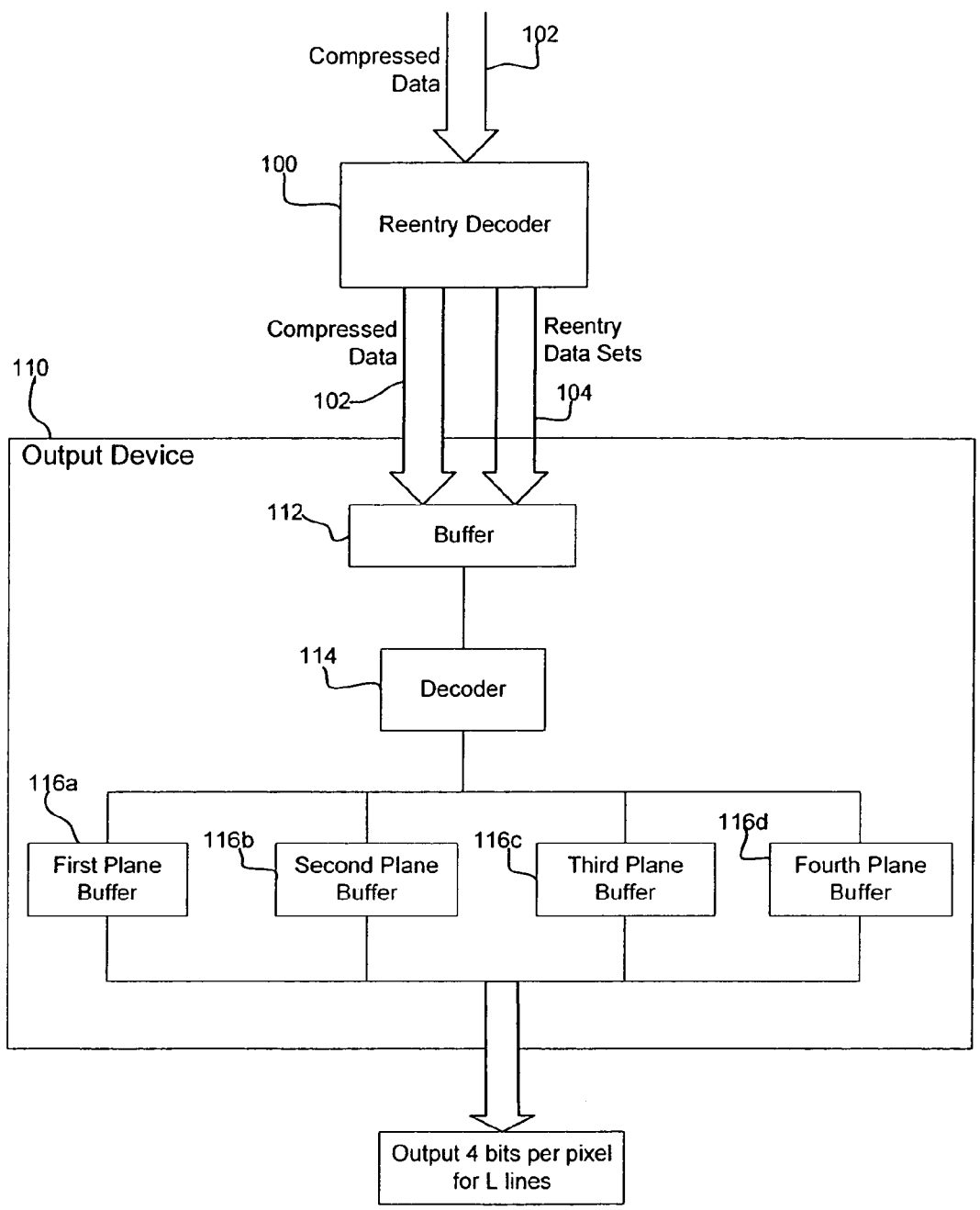
FIGS. 1A and 1B illustrate computing environments in which aspects of the invention are implemented.
Figure 2:
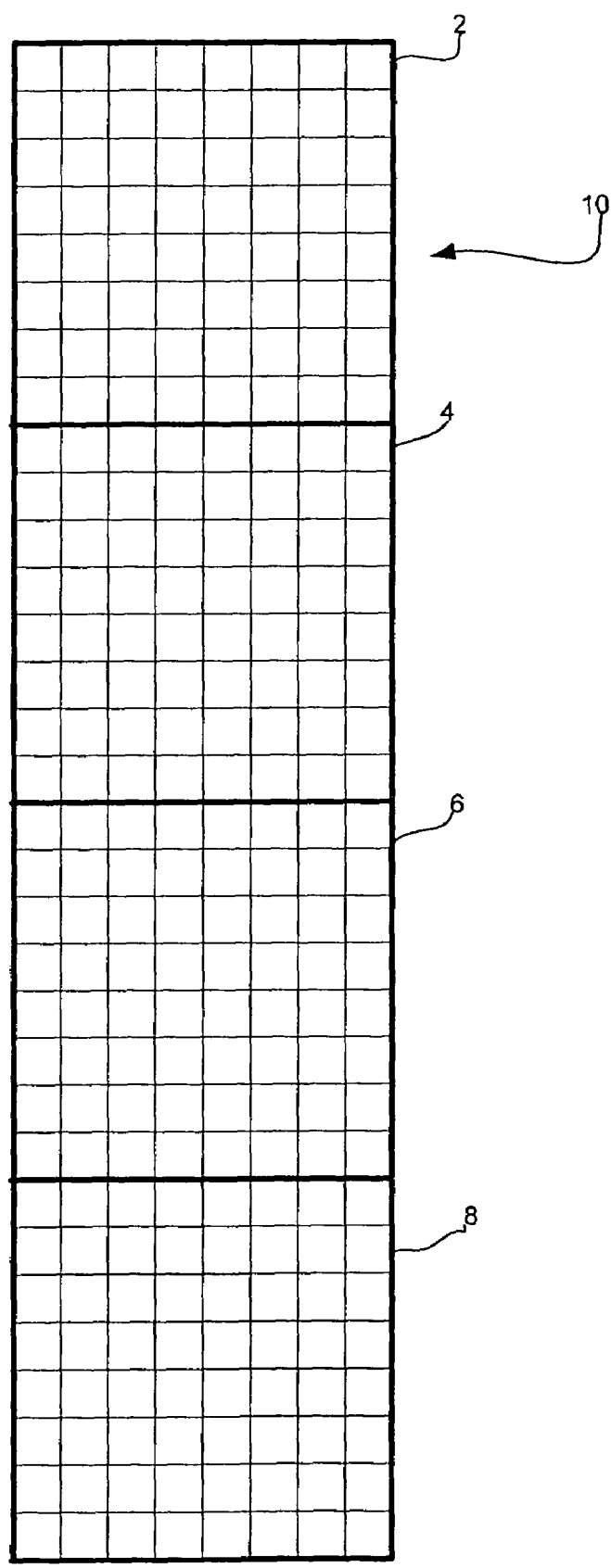
FIG. 2 illustrates an arrangement of bit planes in a manner known in the prior art.

FIG. 1A illustrates a computing environment in which preferred embodiments are implemented. A reentry decoder 100 receives a compressed data stream 102, which in preferred embodiments comprises a concatenated data stream, such as shown in FIG. 2 above, compressed using a standard ABIC algorithm known in the art. The reentry decoder 100 decompresses the compressed data stream 102 in the manner described below to generate reentry data sets 104 to allow a subsequent decoding operation to independently decode from different points in the compressed data stream 102. A reentry data set is provided for each plane 4, 6, 8 in the compressed concatenated bitmap. In the case that there are only two concatenated planes, only one reentry data set is needed to decode at the first bit in the second plane. As discussed, a reentry data set is not needed to decode the first plane because current decoding algorithms assume a default value of history bits to decode the first line of bits in the first plane. Likewise more planes require more reentry data sets.

Figures 3A, 3B:
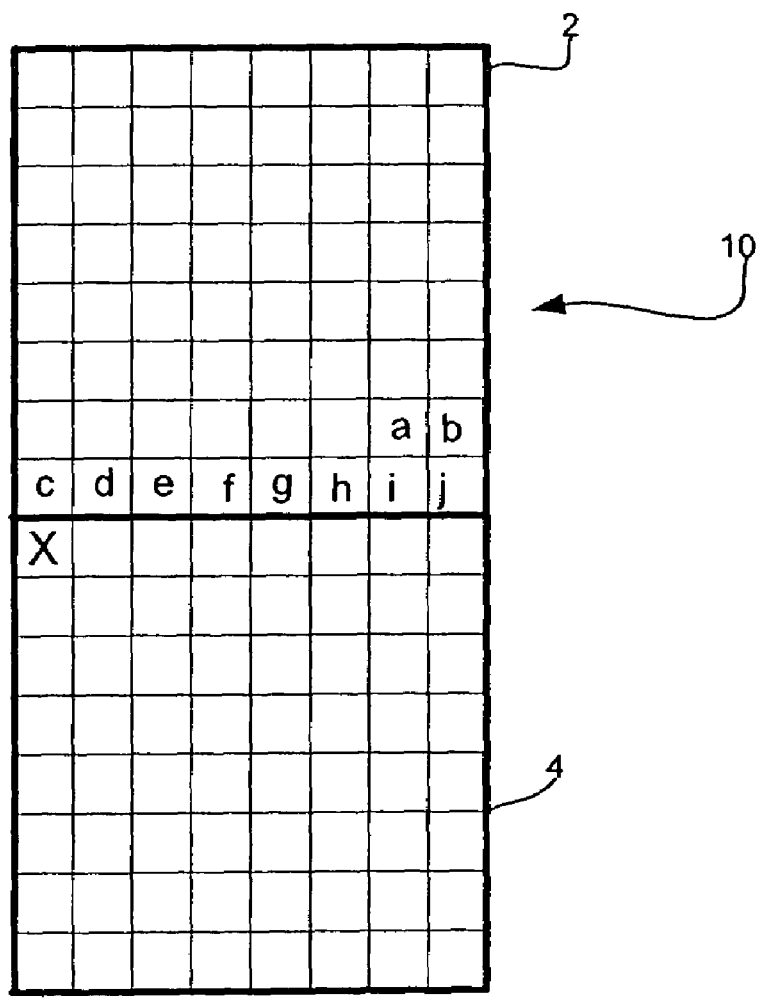
FIGS. 3A and 3B illustrate the history bit values maintained for use in decoding compressed data in a manner known in the prior art.

The reentry data set for a plane comprises an offset or pointer to a position in the compressed data whose decompressed output comprises one bit value for the first bit in one of the planes 4, 6, and 8; a history line of decoded bits, and 128 probability estimates. The history line comprises a last line of N bits plus two decoded bits, wherein N is the number of bits per line in the bit plane. The seven nearest neighbor bits used in the decoding comprise the following bits from the history line, the last two decoded bits and the bit range from the (N−2) bit to the (N+2) bit. FIG. 3A illustrates the seven history bits used to decode bit "X" in the event that the bit to decode is in the middle of a line of the bit plane, which would comprise the two most recent decoded bits i and j, as well as the range of bits from the previous line, which comprise bits a through e. FIG. 3B illustrates a line of the last N plus two bits, where N is eight. The bits in FIG. 3B used to decode "X" would comprise the last two decoded bits i and j and the last sixth to tenth bit, or bits a through e. In this way, the nearest bits are defined in raster scan order. The bit selection of bits to use to decode one bit shown in FIGS. 3A and 3B are used in the current art to select bits from the last N plus two history bits to use in the ABIC decoding operation. The seven selected neighbor bits are used to select one of the 128 probability estimates to use to decode the first bit in plane 4 in a manner known in the art.

When coding the concatenated data stream, a coder (not shown) uses arithmetic coding to code a particular bit value based on seven neighbor bits and a probability estimate selected based on the value of the seven neighbor bits in a manner known in the art. The decoder that decodes the concatenated ABIC data stream looks at the seven neighbor bits and determines a probability estimate for the current bit being considered. The decoder then uses the probability estimate to decode the actual bit value. In this way, in a manner known in the art, the coding and decoding systems use the same statistical model or dynamic probability estimation process to determine how each coding decision is "conditioned" on prior coding decisions. Thus, the reentry decoder 100 would use the same dynamic probability estimation process to determine the probability estimate based on past data used by the coder when coding/compressing the data stream 102 in a manner known in the art. Further details of decoding and encoding the data stream are described in U.S. Pat. No. 4,905,297 and the IBM publication "A Multi-Purpose VLSI Chip for Adaptive Data Compression of Bi-Level Images", both incorporated by reference above. Further, "JPEG: Still Image Data Compression Standard", by William B. Pennebaker and Joan L. Mitchell (Van Nostrand Reinhold, 1993), at pages 409-430 describe arithmetic binary decoding and encoding.

In preferred embodiments, the history data for the first bit in the first plane 2 is assumed to be all zero data. After generating reentry data sets 104 for the first bit on the second plane 4, third plane 6, and fourth plane 8, the reentry decoder 100 transfers the received compressed data stream 102 and calculated reentry data sets 104 to an output device 110, which may comprise any device known in the art capable of rendering input data, such as a printer, display, a storage device for future rendering, etc. The entire compressed data stream 102 and reentry data sets 104 are stored in buffer 112 of the output device 110. The output device 110 includes a decoder 114 that accesses the reentry data sets 104 in the buffer 112 to decompress one or more lines of bit data from each of the four planes in the compressed data stream 102. The decoder 114 stores one or more lines of decompressed data from each plane in the respective plane buffer 116a, b, c, d. Once the decoded bit data for one or more lines from each plane 2, 4, 6, 8 is transferred to the buffers 116a, b, c, d, respectively, the complete four bits for one or more pixels may then be transferred to the output device and rendered or further processed, e.g., halftoned, screened, dithered, etc., before being rendered.

The decoder 114 may use multiplexing logic to sequentially decode one or more lines of bit data in each plane. Alternatively, the decoder 114 may be comprised of separate decoders to decode in parallel the bit data for each plane. The buffers 112 and 116a, b, c, d may be part of the same memory device or separate hardware buffers or memory devices. The reentry decoder 100 and decoder 114 may comprise an ABIC decoder, or any other decoder known in the art. The reentry decoder 100 may be located either external or internal to the output device 110. If the reentry decoder 100 is located internal to the output device 110, then the reentry decoder 100 unit may be separate from the decoder logic 114 or both may be part of the same logic unit. In alternative embodiments, the encoder could save-off the reentry data sets when coding the data stream and provide the reentry data sets to the decoder 114 to use to decode the compressed data stream at multiple points. This alternative implementation avoids the need for a reentry decoder 100 as the encoder is used to generate the reentry data sets.

Figure 1B:
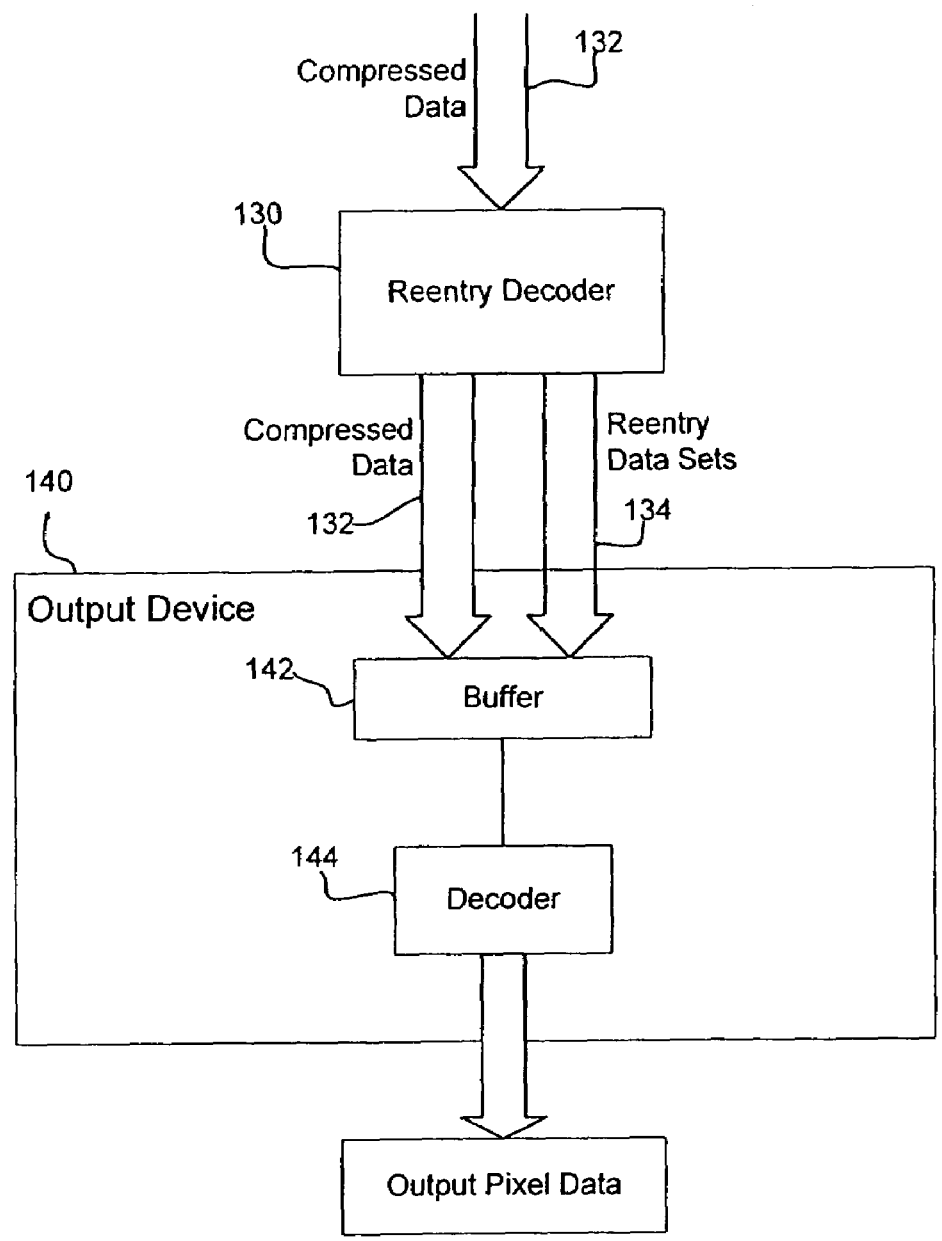

FIG. 1B. illustrates an alternative computing environment in which further aspects of the invention are implemented. A reentry decoder 130 receives compressed data 132, which in alternative preferred embodiment comprises Huffman-encoded baseline JPEG data. The reentry decoder 130 partially decompresses the compressed data stream 132 in the manner described below to generate the reeentry data sets 134 to allow a subsequent decoding operation to independently decode from different points in the compressed data stream 132.

A reentry data set 134 in the implementation of FIG. 1B is composed of the bit pointer to the compressed data at the Minimum Coded Unit (MCU) boundary, the DC predictor values for all the components in the MCU and the output location of the MCU. A Forward Discrete Cosine Transform (FDCT) creates 64 coefficients. The first coefficient in the upper right hand corner is for zero frequency and comprises the DC coefficient or predictor. The other of the 64 coefficients are called AC coefficients.

Each reentry segment contains an arbitrary number of MCUs. The reentry decoder 130 needs only to partially strip the Huffman entropy coding. After generating reentry data set 134, the reentry decoder 130 transfers the compressed data stream 132 and the reentry data sets 134 to an output device 140, which may comprise any device known in the art capable of rendering input data, such as printer, display, a storage device for future rendering, etc. The entire compressed data stream 132 and the reentry data sets 134 are stored in the buffer 142 of the output device 140. The output device 140 includes a decoder 144 that decodes the compressed data stream 132. On encountering an error, the decoder 144 recovers by advancing to the next reentry point specified in the reentry data sets 134, uses the information to reestablish the DC predictors and the start of the MCU block, and continues decoding.

Figure 4A:
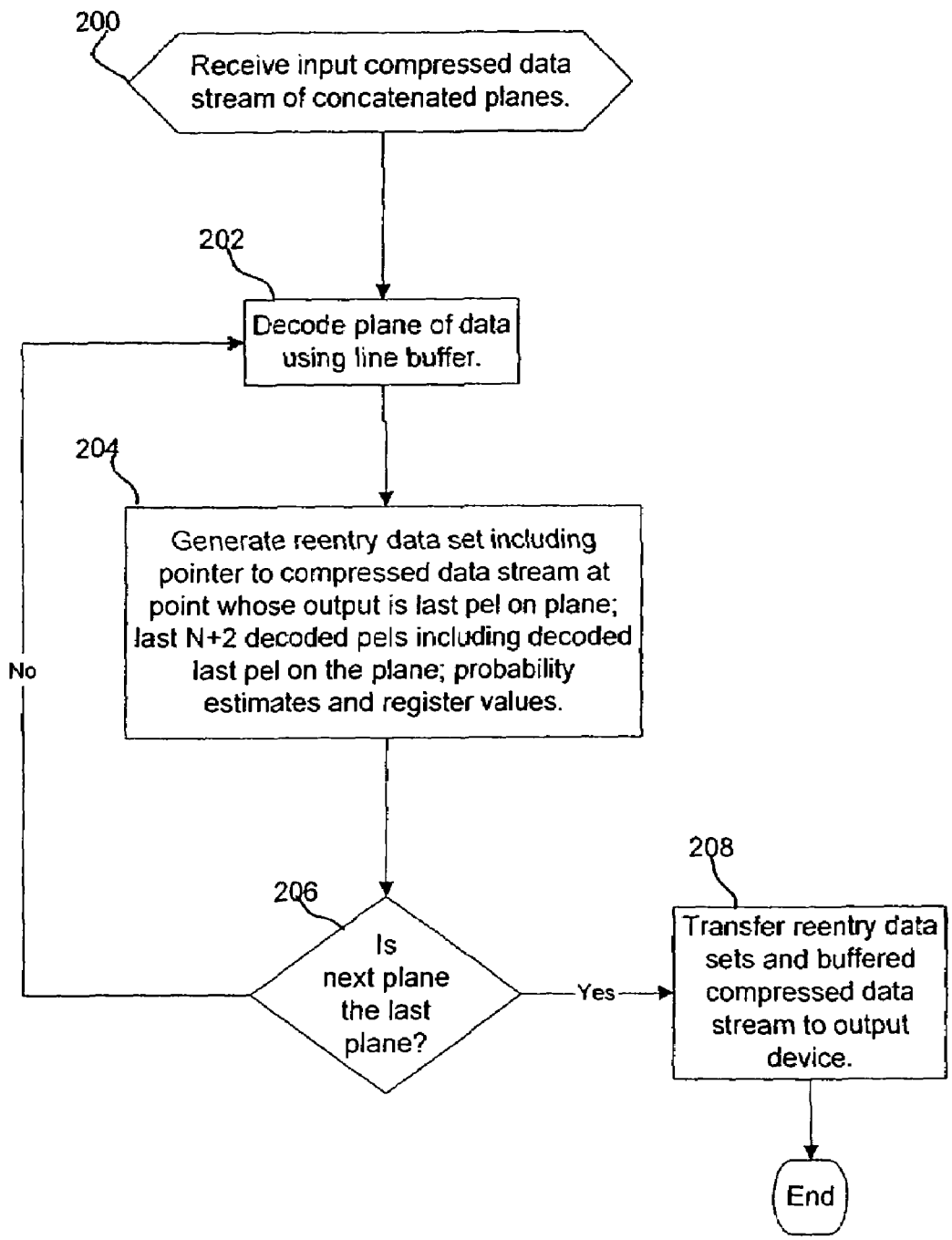
FIGS. 4A and 4B illustrate different implementations of logic to generate reentry data sets in accordance with preferred embodiments of the present invention.

FIG. 4A illustrates logic implemented in the reentry decoder 100 to decode the compressed data 102 for the purpose of generating reentry data sets 104 for the decoder 114. Control begins at block 200 with the reentry decoder 100 receiving the compressed data 102. The reentry decoder 100 decodes (at block 202) a plane of bits using a line buffer for the history data in a manner known in the art. The reentry decoder 100 uses a rolling buffer and overwrites previously decoded data as each bit is decoded to maintain the last N plus two bits, where N is the number of bits in a line of the planes. To determine when a plane of bits has been decompressed, the reentry decoder 100 would use the known height and width dimensions of the planes in the concatenated compressed data stream 102, and the number of lines in each plane. By keeping track of the cumulative number of decompressed lines, the reentry decoder 100 could determine whether a decompressed line is the last line in a plane. Alternatively, there may be an end of plane marker in the compressed data stream 102, which the reentry decoder 100 would use to determine when the last line of a plane has been decompressed.

After decoding the last bit on the plane and buffering the last N plus two decoded bits including the last decoded bit on the plane, the reentry decoder 100 generates (at block 204) a reentry data set comprising a pointer to a location in the compressed data stream whose decoded output is the first bit in one plane 4, 6, 8 following the first plane 2, the last N+2 decoded bits preceding the first bit in a plane, the 128 probability estimates, and any register values used during decoding. For instance, the Q-coder used in ABIC coding/decoding maintains A and C registers indicating an interval of bits being coded. If (at block 206) the next plane is the last plane to decode, then the reentry decoder 100 transfers (at block 208) the compressed data 102 including any generated reentry data sets 104 to the buffer 112 in the output device 110 and ends. As discussed, the first plane 2 in the compressed data stream 102 is assumed to have initialized values prior to the first bit in the first plane, such that the last N plus two bits in the history line for the first plane 2 all have zero value.

With the logic of FIG. 4A, the reentry decoder 100 does not need a large buffer because it only needs to buffer the last N plus two decoded bits at a time for each bit decoded in addition to the statistical data and other information needed to continue decoding, such as probability estimates, register values, etc.

After generating the reentry data sets 104, the reentry decoder 100 transmits the compressed data 102 and reentry data sets 104 to the decoder 114. In preferred embodiments, the reentry decoder 100 transfers the data stream in compressed format regardless of whether the reentry decoder 100 is located internal or external to the output device 110 to minimize the transfer time to the buffer 112 used by the decoder 114.

Figure 4B:
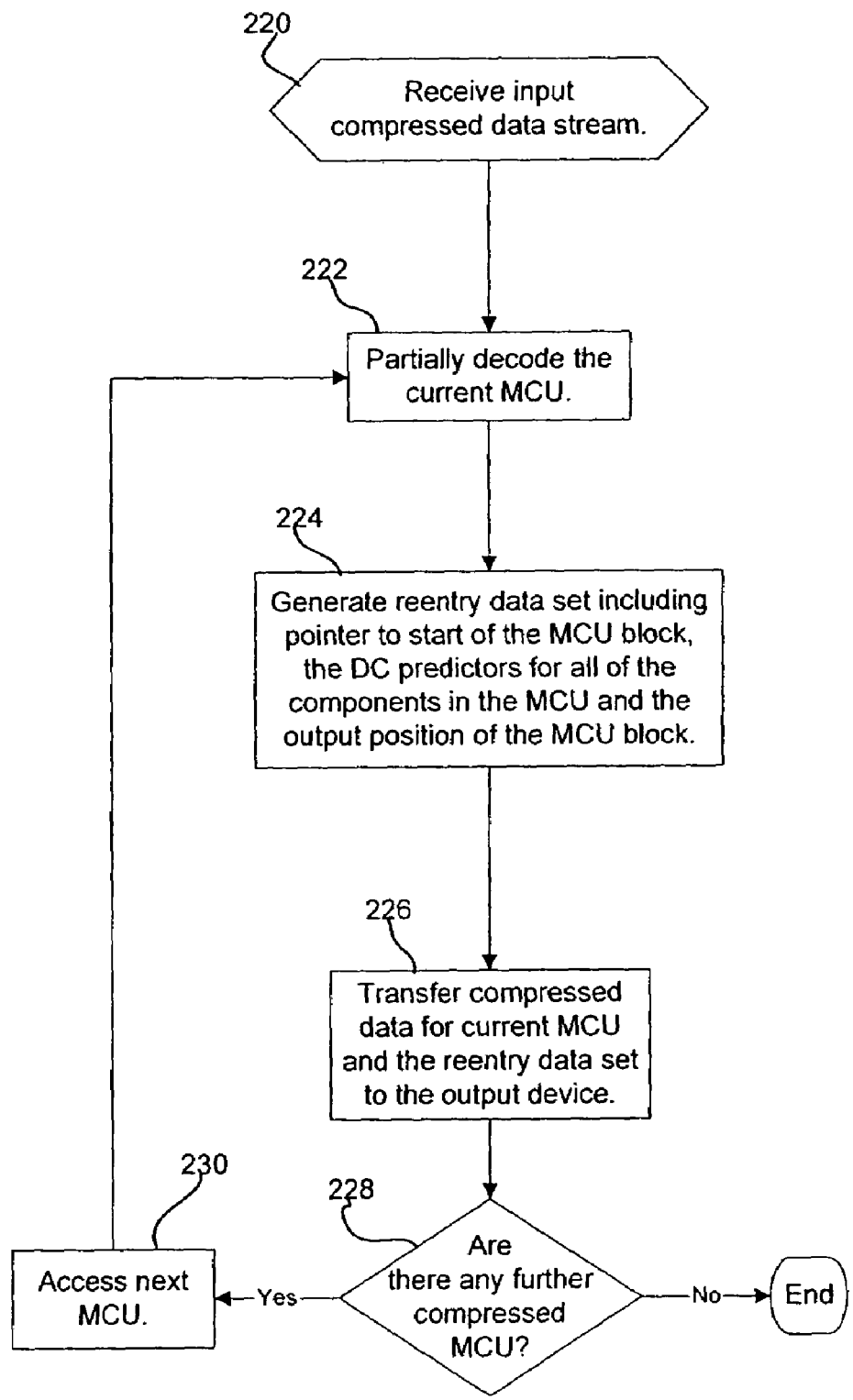

FIG. 4B. illustrates the logic to generate the reentry data sets if the data is compressed using a baseline JPEG algorithm. Control begins at block 220 with the reentry decoder 130 receiving the compressed data 132. The reentry decoder 130 partially decodes the current MCU in the manner known in the art at the block 222. The DC terms of each block are decoded in full for every block. The AC components need not be fully decoded. An RS byte must be parsed, but the extra bits that follow are skipped. To encode the DCT block efficiently using the Huffman entropy coding, the AC coefficients are expressed as a set of RS byte+extra bits terms. The RS byte has the R nibble and S nibble. "R" means "Run" and indicates how many zero AC terms precede the current term, up to 15. If two nonzero AC terms follow one another, the second will have the R of zero. The "S" nibble gives the size of the AC term described by the entry. If S is zero, then the current AC term is also zero, R is 15 and the run is 16 terms long. A nonzero value for S indicates the number of bits following the RS entry. These bits can be used to decode the current AC coefficient. For partial decoding, the RS byte is decoded and parsed. The R position indicates how many coefficients are skipped and the S position indicates the number of following bits. An RS of 0x00 indicates the end of a block (i.e., all the remaining AC coefficients are zero).

The reentry decoder 130 parses the RS byte to locate the end of the block and thus the DC term of the next block. In block 224 the reentry data set is generated comprising of the bit pointer to the start of the MCU block, the DC predictors for all of the components in the MCU and the output position of the MCU block. The compressed data for the current MCU is then transferred (at block 226) to the output device 140, together with the reentry dataset 134. At blocks 228 and 230, any further compressed MCUs are also decoded. In certain implementations, the reentry data set 134 may not be transferred with the every MCU in the data stream, but only at selected points in the data. If there are more MCUs in the image, control proceeds back to block 222 to decode the next MCU.

Figure 5A:
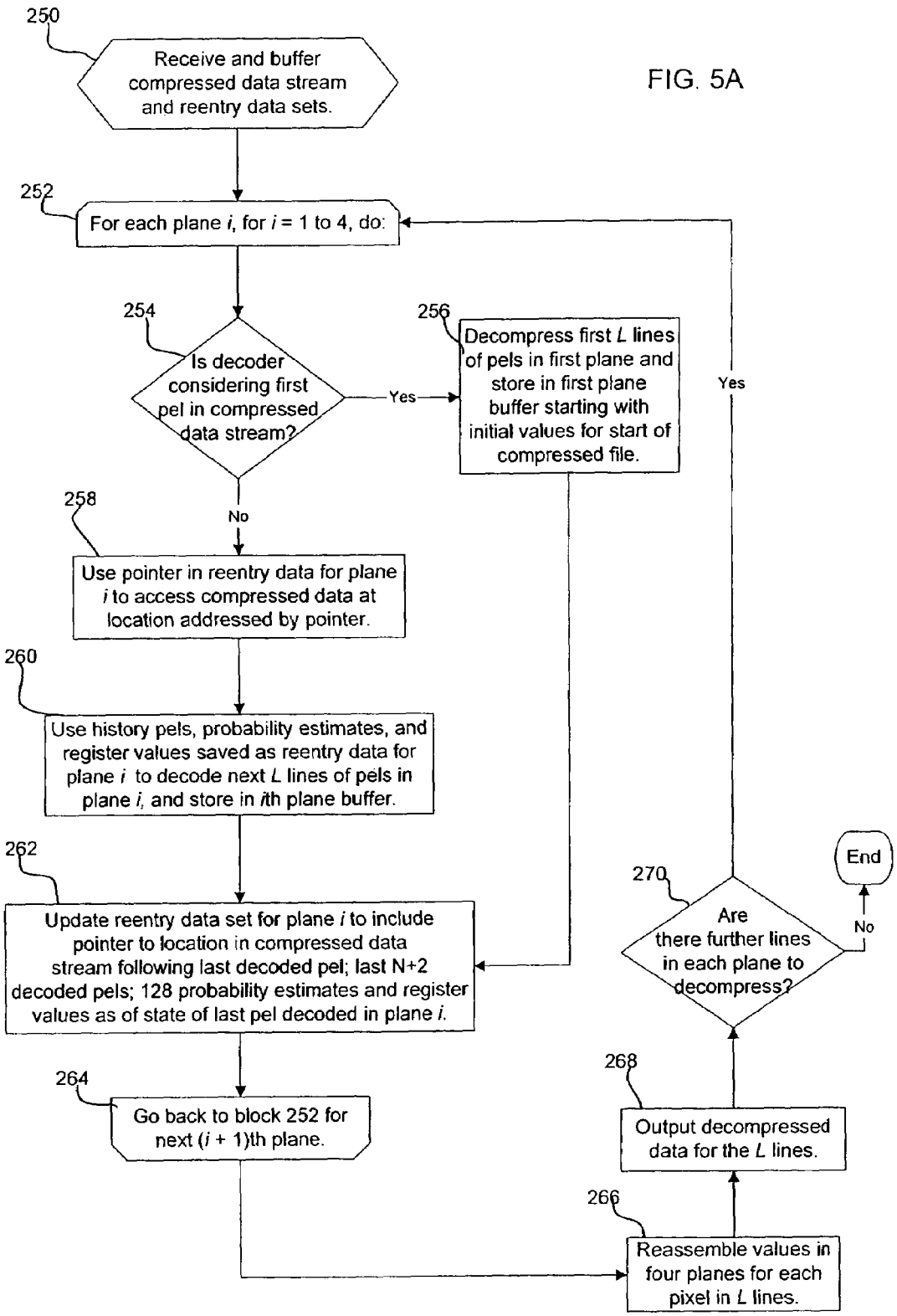
FIGS. 5A and 5B illustrate different implementations of logic to use the reentry data sets to decompress and output multi-bit pixels in accordance with preferred embodiments of the present invention.

FIG. 5A illustrates logic implemented in the decoder 114 to decompress the compressed data stream 102 using the generated reentry data sets 104. In FIG. 5A, the decoder 114 multiplexes between decoding L lines of bits in each plane, where L comprises one or more lines. Control begins at block 250 with the decoder 114 receiving and buffering in buffer 112 the compressed data stream 102 and reentry data sets 104. The decoder 114 performs a loop at blocks 252 to block 264 to multiplex the decoding of L lines in each of the four planes. If (at block 254) the decoder 114 is starting the decoding process at the first bit in the first plane, then the decoder 114 decodes/decompresses (at block 256) the first L lines of bits in the first plane in a manner known in the art to decompress the initial bits in a compressed data stream. As discussed when decompressing the first line in the data stream 102, the decoder 114 would assume that the previous line included all zero bit values and use initial values for register values and the probability estimates when decoding a first bit of an ABIC compressed data stream.

If (at block 254) the decoder 114 is not decoding the first line of the compressed data 102, then the decoder 114 uses (at block 258) the pointer in the reentry data set for plane i to access the compressed data stream 102 at the location addressed by the pointer. The decoder 114 then uses (at block 260) the N plus two history bits, the probability estimates, and the register values saved with the reentry data set for plane i to decode the next L lines of bits in plane i in a manner known in the art. The decoded L lines of bits are stored in their corresponding plane buffer 116*a, b, c,* or *d*. After decoding the L lines, the decoder 114 updates (at block 262) the reentry data set for plane i to include decoding information at the state of the last bit decoded in plane i, including a new pointer to a location in the compressed data stream whose output is the bit following the last decoded bit, the previously decoded N+2 bits, the 128 probability estimates, and current register values. In preferred embodiments, a reentry data set for the first plane is first populated with data after the first L lines of bits in the first plane have been decoded using default initialization values. In this way, the decoder 114 can shift to processing bits in the next plane (i+1) and use the updated reentry data set information to later proceed directly to decode the next L lines of bits in plane i after completing the decoding of L lines in the other planes. At block 264, the decoder 114 proceeds back to block 252 to multiplex through the next L lines from the next plane.

After decoding the same L lines from each of the four planes, the decoder 114 reassembles (at block 266) the buffered bits in the four planes so each pixel value has four-bit values, one bit from each plane. The reassembled bits for the pixels in the L lines are then outputted (at block 268), where they may be rendered or further processed, such as screened, halftoned, dithered, etc. If (at block 270) there are further lines of bits in each plane to decompress, then control transfers to block 252 to decode/decompress the next L lines of bits in each plane. In further embodiments, the decoder 114 may begin further decoding operations during the process of reassembling and outputting the buffered bit values.

In the logic of FIG. 5A, the decoder 114 multiplexed decoding operations by sequentially decoding L lines from each plane, outputting the decoded data, and then proceeding to decode the next L lines in each plane. In alternative embodiments, the decoder 114 may comprise four separate decoding units to allow for the parallel decoding and buffering of L lines of bits at a time in each plane.

With the logic of FIG. 5A, the decoder 114 outputs decompressed data faster than techniques known in the art because the decoder 114 can output L lines of data from each plane before having to complete the decoding of the first three planes. In the prior art, the decoder must buffer the decoded first three planes of data and lines from the fourth plane before data can be outputted. With the preferred embodiments, a smaller buffer size may be used to buffer decoded bits because the decoder 114 only needs to buffer L lines of bits from each plane at a time, not the entire first three planes.

The preferred embodiments utilize the previously generated reentry data sets to allow the decoder to break into different parts of the compressed data stream to decode and output L lines of bits from each plane before proceeding with further lines in the planes. For illustrative purposed a monochrome image with 4-bits per pixel has been used. The preferred embodiments also apply to monochrome pixels with more or less bits per pixel and to the bit planes created from the multiple components of a color image.

Figure 5B:
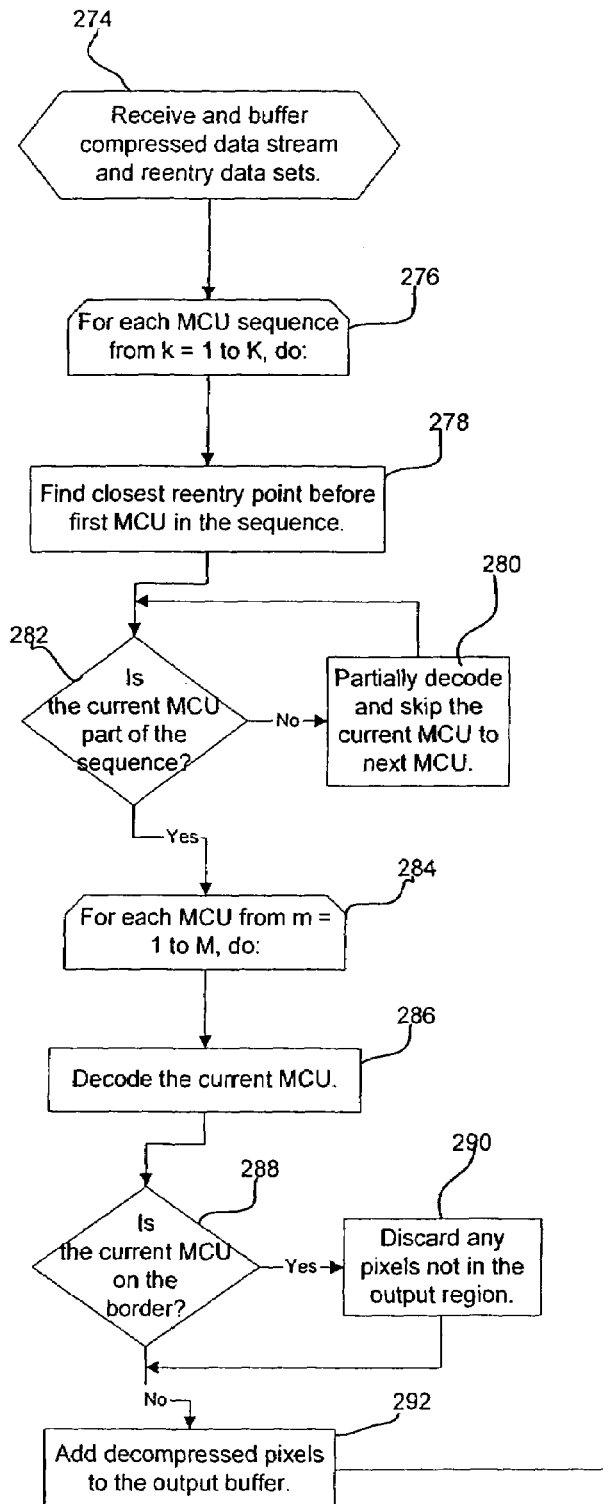
Figure 5B:
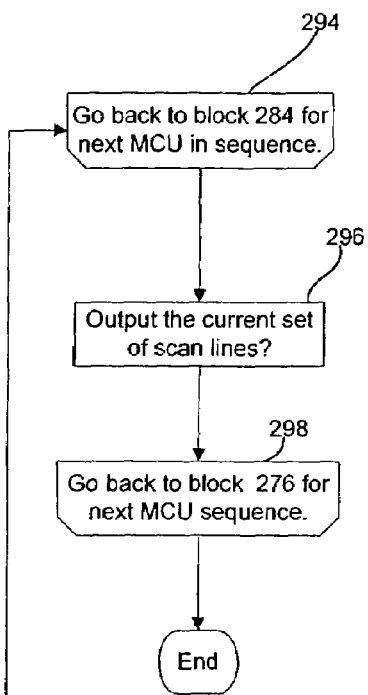

FIG. 5B illustrates the logic implemented in the decoder 144 if the data is compressed using a baseline JPEG algorithm. For the decompression, the compressed datastream can be treated as a sequence of compressed MCUs. To decode an arbitrary rectangular area of the image, the decoder 144 must decode one or more disjoint subsequences of MCUs, each representing a set of output scanlines. The region need not be aligned on MCU boundaries. In that case, after decompressing each MCU, parts of the border MCUs that fall outside of the desired region are discarded. The algorithm illustrated in FIG. 5B also works correctly for the trivial case, where the whole image is being decompressed.

The decoder 144 decodes K disjoint MCU sequences, with M MCUs in each. The control starts at block 274 with the output device 140 receiving and buffering in buffer 142 the compressed data stream 132 and reentry data sets 134. The decoder 144 performs a loop at block 276 to 298 to decode all the MCU sequences. Each loop iteration decodes a complete set of scanlines in the output region. The decoder 144 first finds (at block 278) the closest reentry point prior to the first block in the current sequence. Note that the image beginning and start of any JPEG restart intervals are by definition "restart pointers". The MCU referenced by the reentry point becomes the current MCU. If, at block 282, the current MCU is not the first MCU of the sequence to be decoded, then the current MCU is partially decoded as described in FIG. 4B and skipped (at block 280). The next MCU becomes the current MCU and control returns to block 282.

If (at block 282) the current MCU is the first MCU in the current sequence of MCUs to be decoded, then the algorithm enters a loop at blocks 284 to 294 over MCUs in the sequence. The current MCU is decoded (at block 286). If (at block 288) the current MCU is a boundary MCU, then any decoded pixels out of the desired region are discarded (at block 290). From blocks 288 or 290, the decompressed pixels are added (at block 292) to the output buffer. At block 294, control proceeds back to block 284 if there are any further MCUs to process, such that the next MCU becomes the current MCU. Otherwise after all MCUs in the sequence are processed, the current set of scan lines is outputted (at block 296) and control returns (at block 298) to block 276 to process the next MCU sequence. After processing all MCU sequences, control ends.

Using the algorithm of FIG. 5B, not all the image must be decoded to generate a rectangular region. Some extra MCU blocks may have to be partially decoded, depending on the position of the region relative to the reentry points. The extra blocks are decoded just enough that they can be skipped, in the manner described in FIG. 4B.

Using Reentry Data Sets for Error Recovery and Other Purposes

In the above described implementations, reentry data sets were used to allow for simultaneous decoding of data in four different data planes and decompressing an image area without decompressing the whole image. Following are some additional uses of reentry data sets.

Figure 6A:
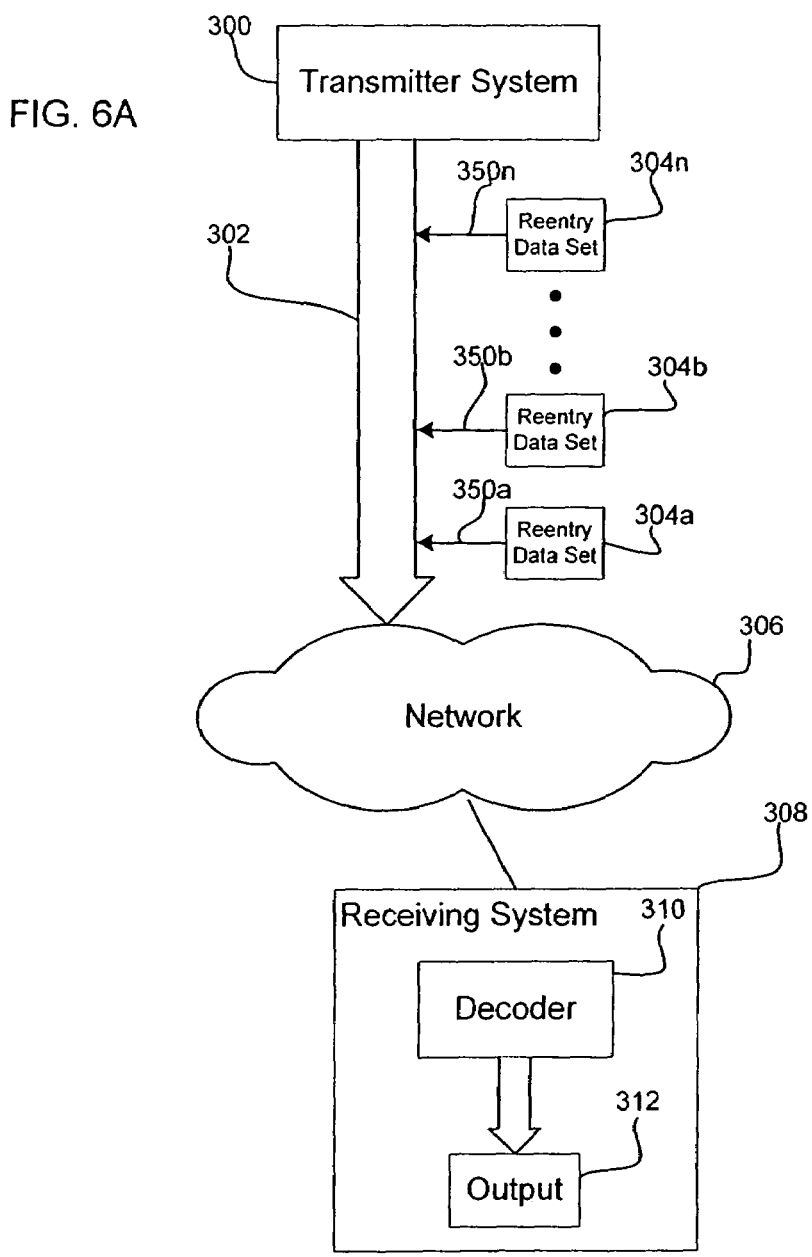
FIG. 6A illustrates a computing environment in which aspects of the invention are implemented.
Figure 6B:
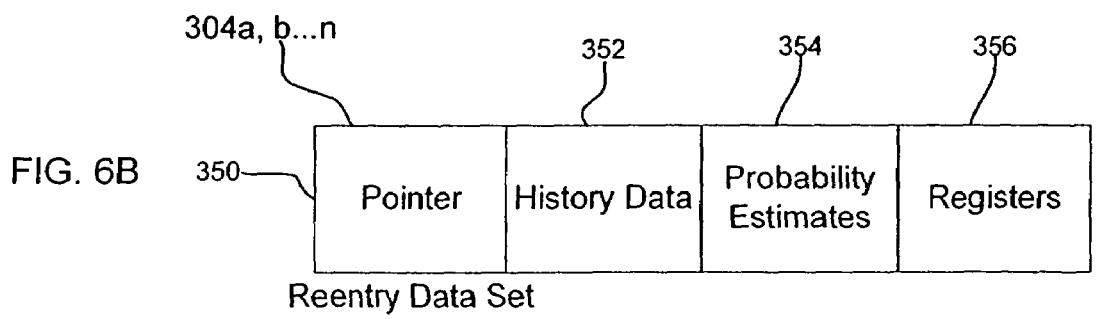
FIG. 6B illustrates a format of a reentry data set data structure in accordance with implementations of the invention.

FIG. 6A illustrates one computing environment including a transmitter system 300 that transmits compressed data 302 and data reentry data sets 304a, b ... n. With respect to FIG. 6B, each reentry data set 304a, b ... n comprises a pointer 350 or offset (shown as pointers 350a, b ... n in FIG. 6A) to a position in the compressed data whose decompressed output comprises one bit value in the data stream, a history line of decoded bits 352, probability estimates 354, and registers 356. More, less or different types of data may be included in the reentry data sets 304a, b ... n, depending on the compression scheme used for the compressed data 302. For instance, in an ABIC decoding operation, 128 probability estimates are provided and the history line comprises a last line of N bits plus two decoded bits, wherein N is the number of bits per line in the bit plane. The seven nearest neighbor bits used in the decoding comprise the following bits from the history line, the last two decoded bits and the bit range from the (N−2) bit to the (N+2) bit. Alternative compression schemes may require different types and/or additional history and statistical data to begin decoding from a specific location within the compressed data 502.

The transmitter system 300 may comprise any type of computer or electronic device that is capable of transmitting digital data over a network 306. The network 306 may comprise any type of data communication network, including a wireless network (e.g., telephone communication system, cellular communication system, digital radio, digital television, satellite, infrared, etc.) or a wired network (e.g., the Internet, an Intranet, Local Area Network (LAN), storage area network (SAN)).

The transmitter system 300 includes the capability to transmit data over the network 306 and a receiving system 308 includes the capability to receive data transmitted, such as compressed data 302 and reentry data sets 304a, b ... n, over the network 306. In certain implementations, the receiving system 308 is capable of bidirectional communication with the transmitter system 300 and in other implementations, the receiving system 308 can only receive data from the transmitter system 300, such as the case with wireless data broadcasts over a radio, satellite or other broadcasting network.

The receiving system 308 may comprise any computing device known in the art, e.g., a computer, server, desktop system, telephony device, hand held computer, palm top, etc., capable of receiving data from the network 306. The receiving system 308 further includes a decoder 310 capable of decoding a stream of compressed data 302 and, if necessary, using the reentry data sets 304a, b . . . n to access the compressed data stream at the location addressed by the pointer in the reentry data set 304a, b . . . n to produce output data 312. The output data 312 may comprise any combination of text, images, video, audio or any other digital output. The decoder 310 may be implemented as software code that is executed by a processor (not shown) within the receiving system 310 or as hardware logic, e.g., an Application Specific Integrated Circuit (ASIC), etc.

Figure 7:
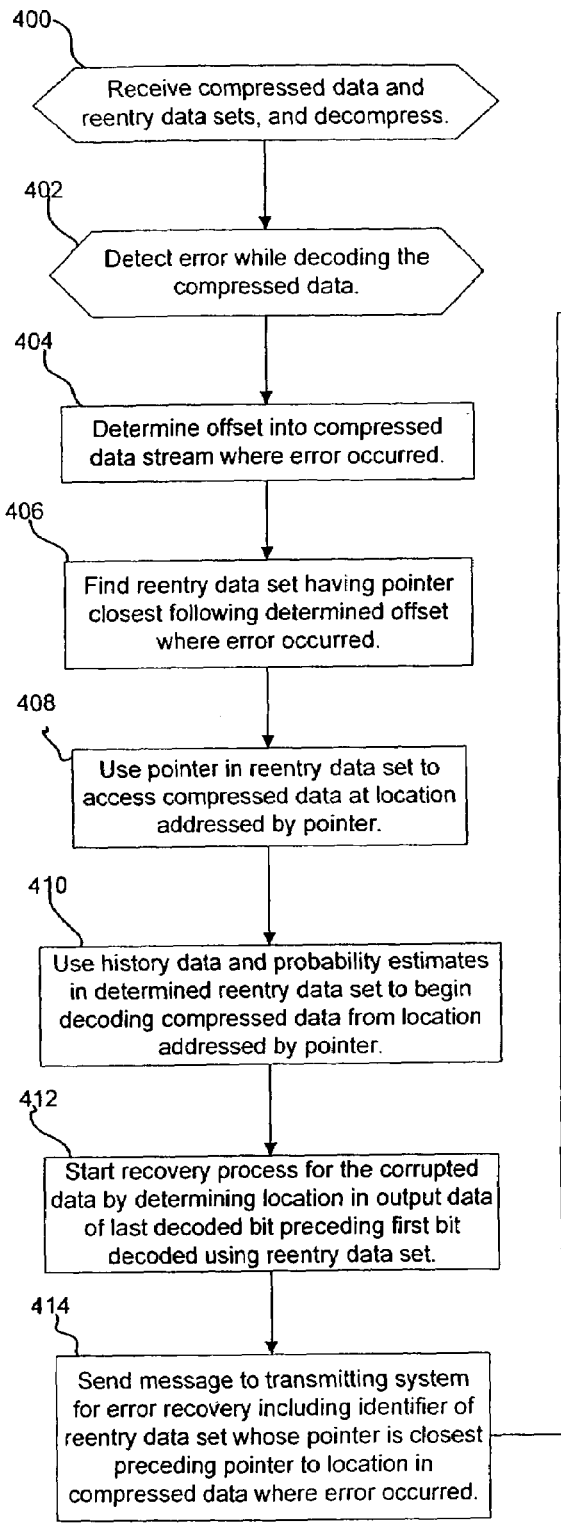
FIG. 7 illustrates logic to decode compressed data and recover from errors in accordance with certain implementations of the invention.
Figure 7:
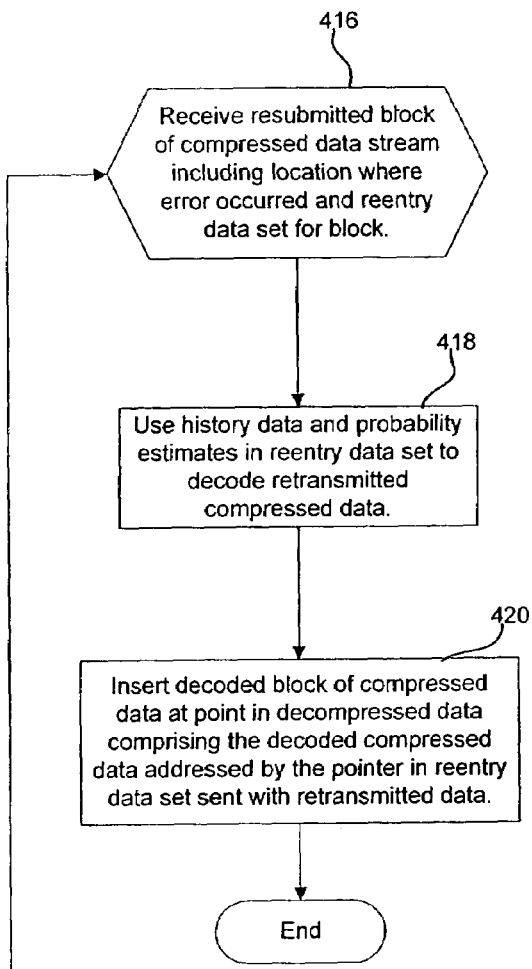

FIG. 7 illustrates logic implemented in the decoder 310 to decode the compressed data 302 using the reentry data sets 304a, b . . . n received from the transmitter system 300. At block 400, the decoder 310 would begin decoding the compressed data 302 in a manner known in the art. Upon detecting (at block 402) an error while decoding the compressed data, the decoder 310 determines (at block 404) an offset into the compressed data stream where the error occurred. The decoder 310 then identifies (at block 406) the reentry data set having a pointer 350a, b . . . n that is the closest in all the reentry data sets 304a, b . . . n to the location of the error and that follows the determined offset. The pointer in the determined reentry data set 304a, b . . . n is then used (at block 408) to access the compressed data 403 at the location addressed by the pointer 350a, b . . . n and the history data 352, probability estimates and any other data in the determined reentry data set 304a, b . . . n is then used (at block 410) to begin decoding the compressed data 302 from the location addressed by the pointer 350a, b . . . n. The decoder 310 then determines (at block 412) the location in the output data of the last decoded bit preceding the first bit decoded using the determined reentry data set. A message is then sent (at block 414) to the transmitting system 300 for error recovery including the identifier of the reentry data set 304a, b . . . n data set 304a, b . . . n whose pointer 350a, b . . . n is the closest pointer that follows the location in compressed data where error occurred.

Upon receiving the error message, in one implementation, the transmitter system 300 would return a block of data between the pointers in the reentry data sets that are the closest preceding and closest following the error location in the compressed data stream. The transmitter system 300 may also transmit the reentry data for the block of transmitted compressed data to allow decoding from the beginning of the retransmitted block including the compressed data where the error occurred.

With respect to FIG. 7, at block 416, the receiving system 308 receives the retransmitted block of compressed data along with the reentry data set for the data block. The decoder 310 would then use (at block 418) the history data and probability estimates in the received reentry data set to decode the compressed data block. The decoded block is then inserted (at block 420) into the output data 312 at the location in the decompressed data comprising the decoded compressed data 302 addressed by the pointer 304a, b . . . n. When the error occurs, the decoder knows the offset into the both compressed and decompressed data, so the mapping is immediately available.

In the implementation described with respect to FIG. 7, the decoded output is any data that is capable of being corrected. For instance, the decoded output may comprise image or text data that can be updated. Further, the data can comprise any other type of digital data that is being buffered before being rendered, such as audio, video, image, text, etc. In such case, the recovered data decoded from the retransmitted block of compressed data would be inserted into the buffer holding the data to be rendered.

Figure 8:
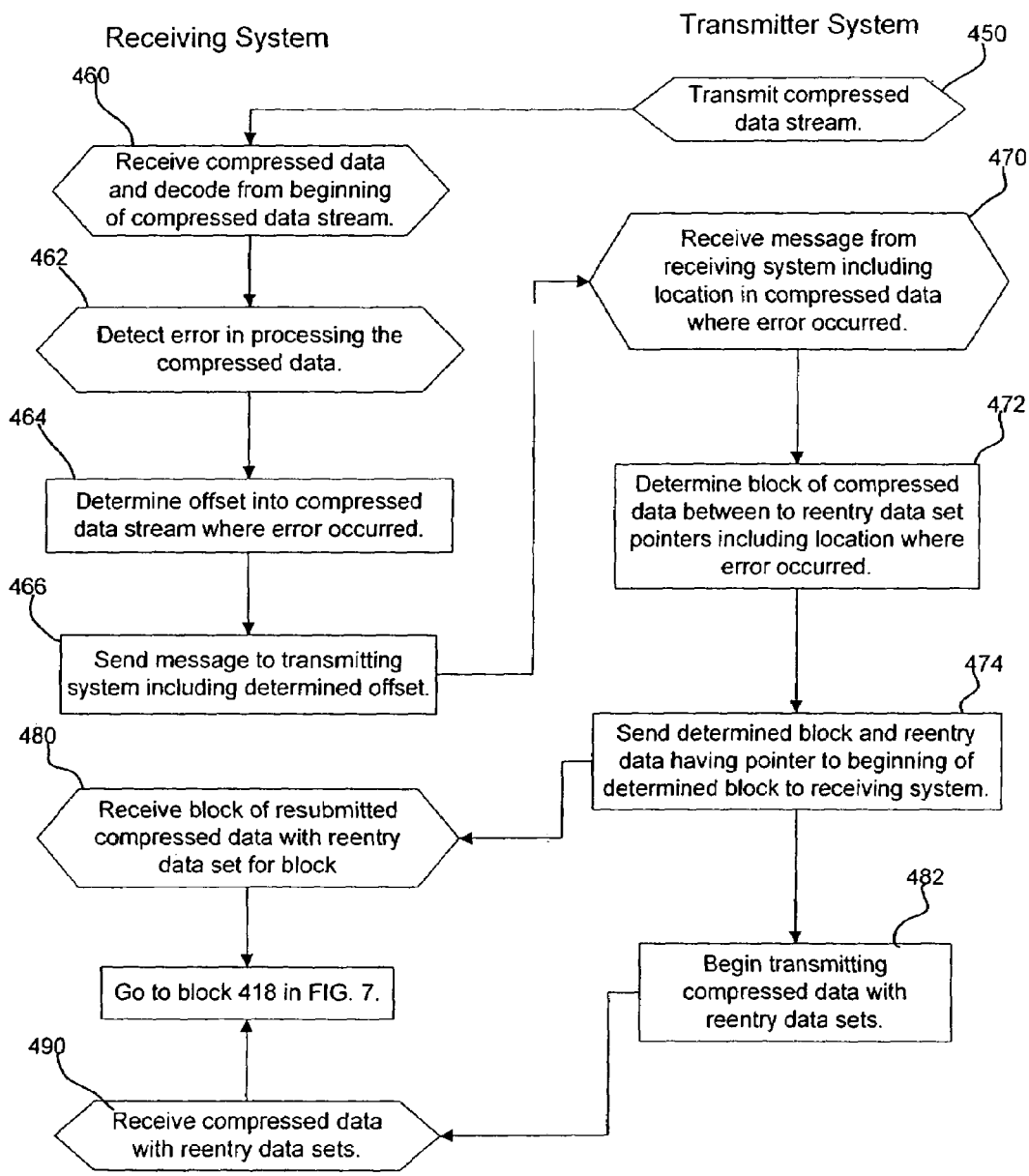
FIG. 8 illustrates logic to decode compressed data and recover from errors in accordance with still further implementations of the invention.

In alternative implementations, the decoder 310 may not attempt to recover from a data error. In such case, the reentry data sets 304a, b . . . n would be used to restart decoding from the closest pointer following the location of the error in the compressed data. This will allow the decoder 310 to continue decoding the compressed data following the location of the error without having to wait to receive a retransmission of data and then start decoding from the beginning of the compressed data. Instead, with the described implementations, the decoder 310 can skip the data with the error and proceed to the location in the compressed data addressed by the pointer in the next reentry data set to continue decoding the data. With this implementation, the output data will only miss that output from the point in the point in the compressed data where the error occurred to the location addressed by the next reentry data set 304a, b . . . n FIG. 8 illustrates an alternative implementation of the logic in the decoder 310. Initially, the transmitter system 300 transmits (at block 450) the compressed data 302 without the reentry data sets. Upon receiving (at block 460) the transmitted compressed data 302, the decoder 310 continuously decodes (at block 460) the compressed data 300 using decoding logic known in the art until an error is detected (at block 462) in the compressed data 302. In such case, the decoder 310 determines (at block 464) the offset location into the compressed data 302 where the error occurred and sends (at block 466) a message to the transmitting system 300 including the determined offset. At block 470, the transmitter system 300 receives the message from the receiving system 308 (sent at block 466) and determines (at block 472) the block of compressed data between two reentry data set pointers 350a, b . . . n that include the location of where the error occurred. The determined block of compressed data and the reentry data set 304a, b . . . n having the pointer 350a, b . . . n addressing the beginning of the determined block are sent (at block 474) to the receiving system 308.

At block 480, the receiving system 308 receives the resubmitted block of compressed data and reentry data set (sent at block 474) and proceeds to block 418 in FIG. 7 to begin decoding data from the retransmitted block of compressed data. After retransmitting the block of compressed data at block 474, the transmitter system 300 begins (at block 482) transmitting compressed data with the reentry data sets 304a, b . . . n because the errors in the previous transmission indicates an increased likelihood of future transmission errors. Upon receiving the compressed data and reentry data sets (at block 490), the receiving system 308 proceeds to block 410 in FIG. 7 to process the compressed data according to the logic of FIG. 7. In such case, upon detecting future errors, the receiving system 308 can continue decoding the data and producing output data using the reentry data sets to skip the block of data including the error. The recovery of the corrupted data can be done prior to or concurrently with decompressing the rest of the image in a manner known in the art.

Figure 9:
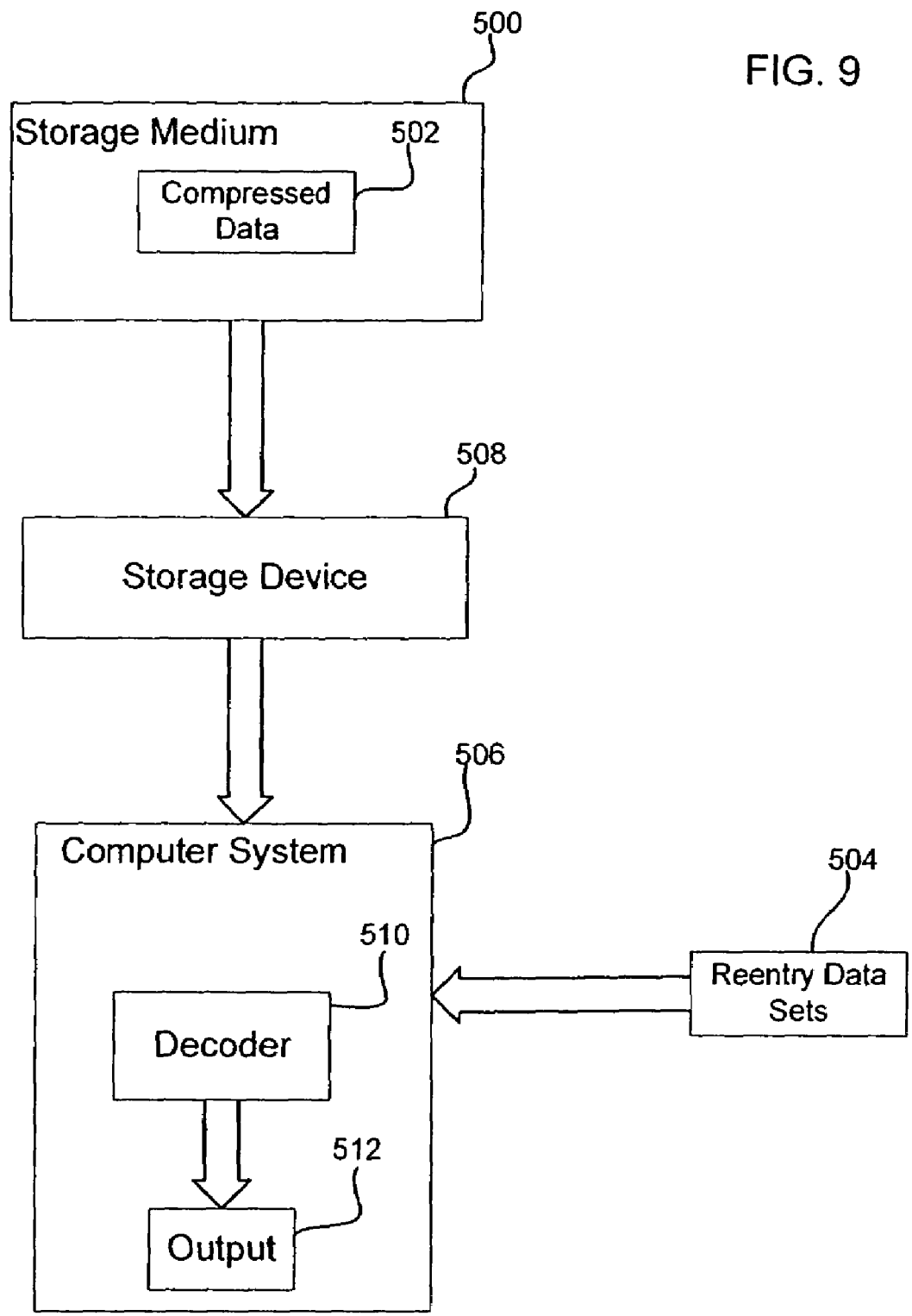
FIG. 9 illustrates a computing environment in which further aspects of the invention are implemented.

FIG. 9 illustrates an additional implementation including a storage medium 500, such as a removable storage medium (e.g., tape cassette, optical disk, swappable disk, etc.) or non-removable storage medium (e.g., one or more hard disk drives, etc.) including the compressed data 502. The reentry data sets 504 for the compressed data 502 may be stored in the storage medium 500 or an alternative location. A computer 506 accesses data in the storage medium 500, including the compressed data 502, via a storage device 508, such as a tape drive, optical disk drive, disk drive interface, etc. The computer 506 includes a decoder 510, such as the decoder 310 described with respect to FIG. 6A, to decode compressed data 502 to produce output 512 and use the reentry data sets 504 to independently break-into a location in the compressed data 502 to start decoding in the event of an error as described above. In alternative implementations, the decoder 510 may be implemented in the storage device 508, such that compression and decompression is handled by the storage device 508.

In certain implementations of FIG. 9, the storage medium 500 may comprise a low-cost, high capacity storage medium, such as a tape cassette, optical disk, low cost hard disk drive, etc., to archive data for extended periods of time, such as several years. One concern with archiving data for extended periods of time is corruption of the stored data resulting from physical defects that occur in the storage medium 500 over time. The described implementations would allow access to the compressed data 502 in the storage medium 500 even if certain data or sectors on the storage medium become corrupt. Upon reaching a location in the storage medium 500 that is defective or where data is corrupted, the decoder 510 could use the reentry data sets 504 to skip the defective/corrupted data and proceed to decode from a location in the compressed data 502 addressed by a pointer in one reentry data set following the defective location in the compressed data 502. Such an implementation would allow decoding of the compressed data 502 to continue beyond the location where the data is corrupt or storage medium 500 is defective. In this way, any corruption of data over time does not render all the archived data inaccessible.

Figure 10:
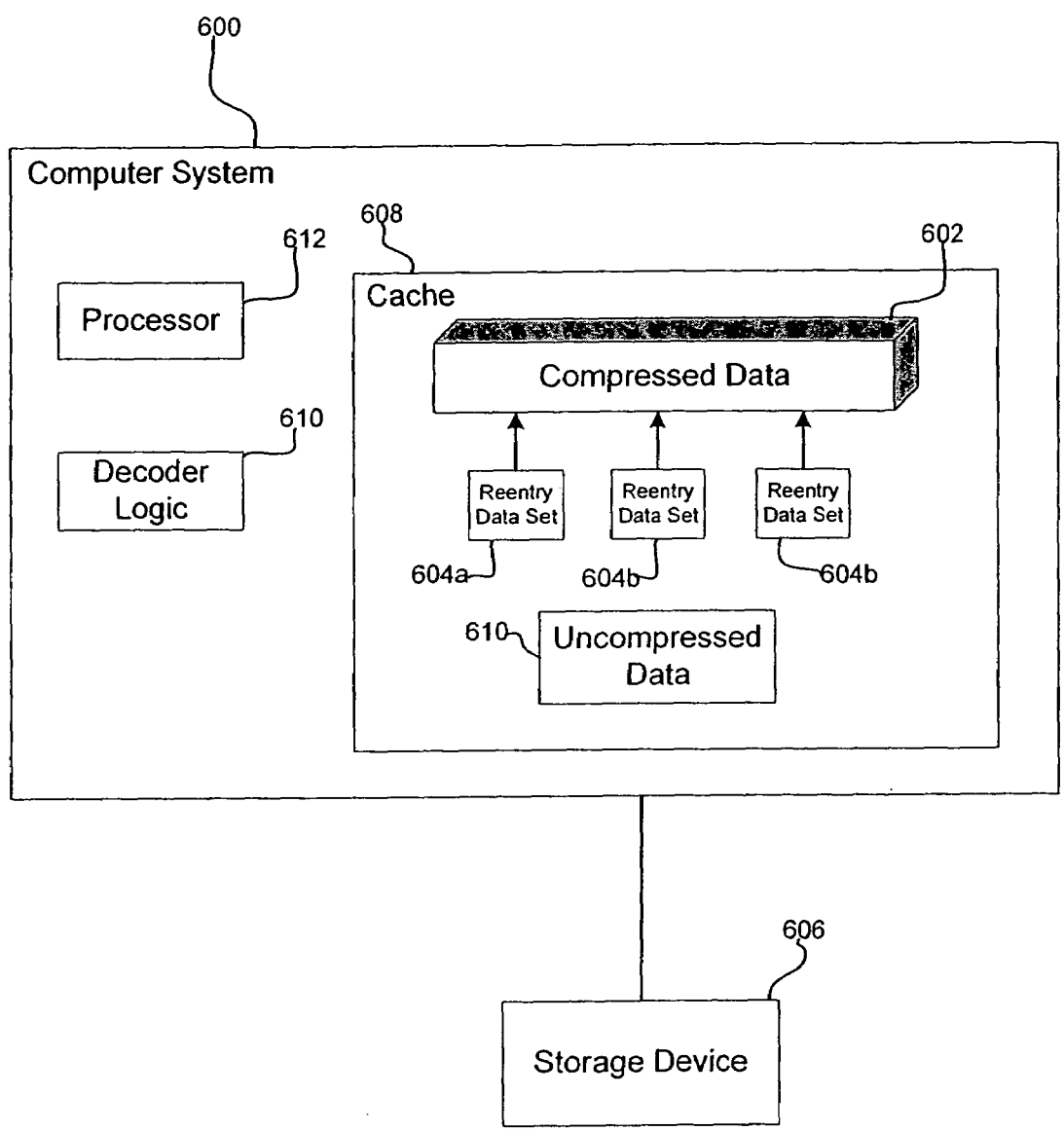
FIG. 10 illustrates a computing environment in which still further aspects of the invention are implemented.

The implementation of FIG. 10 may also apply to an environment where the storage medium 500 comprises a hard disk drive that stores active data in a compressed format. For instance, the decoder 510 may execute in the operating system kernel to decode compressed data 502 to return to operating system or application program processes. The decoder 510 could use the reentry data sets 504 to provide the operating system and application processes continued access to data in the event that a section of the compressed data 502 is corrupt or stored on a defective sector of the storage medium 500.

FIG. 10 illustrates a still further computing environment in which the invention may be implemented. A computer system 600 would load compressed data 602 and reentry data sets 604a, b . . . n for the compressed data 602 from a storage device 606, such as a hard disk drive, to a high speed cache 608, such as a volatile memory device. The computer system 600 includes decoder logic 610 and a processor 612. The decoder logic 610 may comprise software code executed by the processor 612 or any other component that performs cache 608 management operations. Alternatively, the decoder logic 610 may be implemented as hardware, such as an Application Specific Integrated Circuit (ASIC), or other integrated circuit type device. The cache 608 comprises higher speed storage than the storage device 606. The decoder logic 610 is capable of using the reentry data sets 604a, b . . . n to decode from different locations in the compressed data 602 to produce uncompressed data 610 in the cache 608.

In the implementation of FIG. 10, the processor 612 may load the compressed data 602 into the cache 608 and decode in cache 608 using the reentry data sets 604a, b . . . n. Storing compressed data 602 in the cache 608 increases the amount of data that may be stored in cache 608, thereby reducing the likelihood of cache misses (requested data is not in cache 608 and must be accessed from the slower storage device 606) and increasing the likelihood of cache hits (requested data can be returned from the higher speed cache 608). Performance is enhanced by reducing cache misses and maximizing cache hits because data can be returned to a requesting computer system 600 process faster from the higher speed cache 608 than the slower speed storage device 606.

Figure 11:
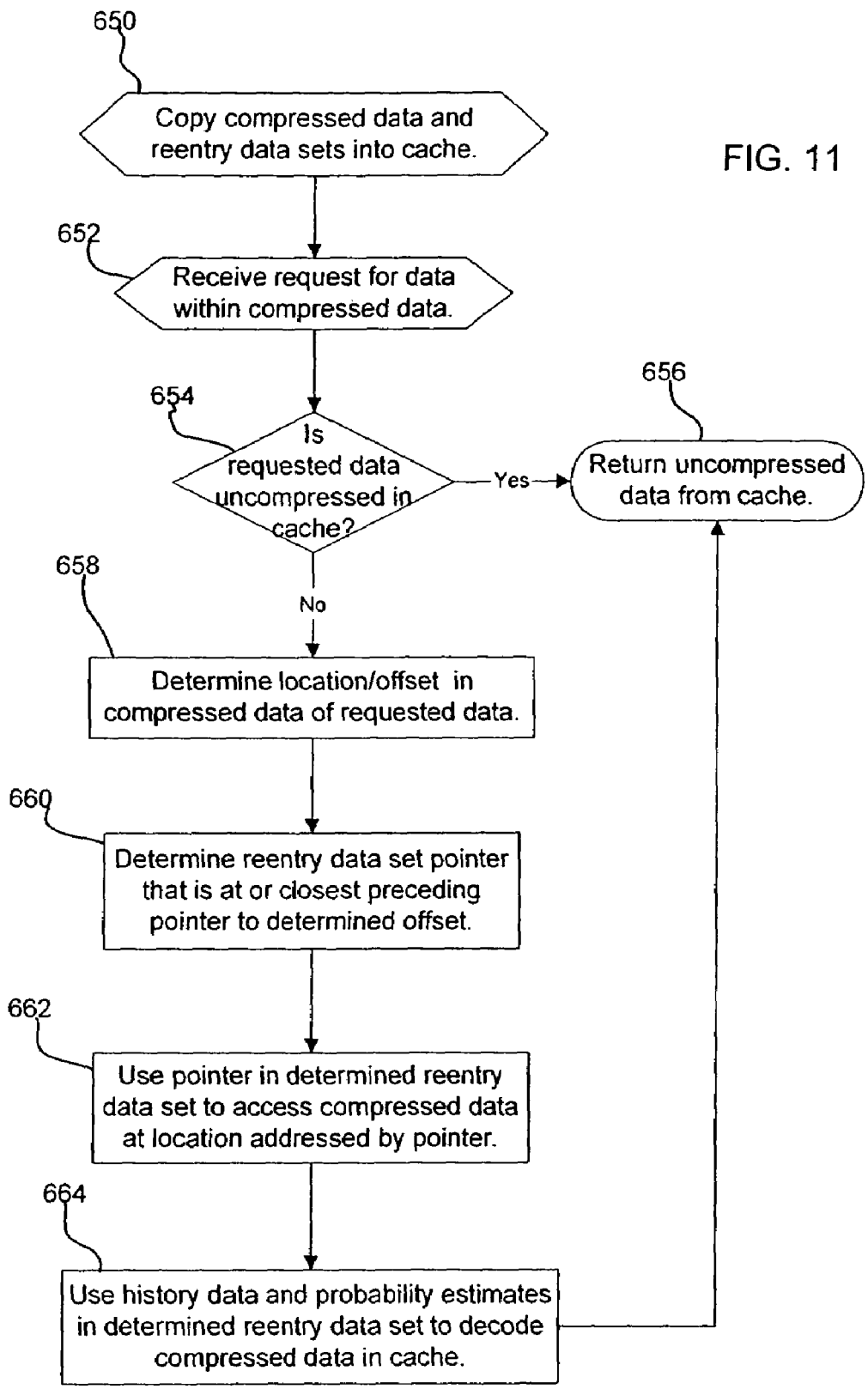
FIG. 11 illustrates logic to decode compressed data within the computing environment illustrates in FIG. 10.

FIG. 11 illustrates logic implemented in the processor 612 and decoder 610 to maintain compressed data 602 in the cache 608. At block 650, the processor 612 copies compressed data 602 and reentry data sets 604a, b . . . n for the compressed data 602 into the cache 608. Upon receiving (at block 652) a request for data that is stored in compressed format 602 in the cache 608, a determination is made of whether the requested data is uncompressed data 610 in cache 608. If so, the processor 610 returns (at block 656) the requested uncompressed data 610 from the cache 608. Otherwise, if the requested data is not uncompressed in cache 608, then the decoder 610 determines (at block 658) the location/offset into the compressed data 602 whose decoded output comprises the requested data. A determination is then made (at block 660) of the reentry data set 604a, b . . . n having a pointer that is at or the closest preceding pointer in the reentry data sets 604a, b . . . n to the determined offset. The decoder 610 then accesses (at block 662) compressed data at the location addressed by the pointer in the determined reentry data set 604a, b . . . n and uses (at block 664) the history data and probability estimates therein to decode the compressed data in cache 608 from the location addressed by the determined reentry data set pointer. After decoding the requested data, control proceeds to block 656 to return the uncompressed requested data from cache 608.

Additional Implementation Details

The decoding logic and operations described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the error recovery are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Preferred embodiments were described with respect to a printer output device. However, the output values may be rendered using output devices other than printers, such as such as display monitors, a storage device for future rendering, etc.

In preferred embodiment, the decoder and reentry decoder are implemented as hardware, e.g., a Field Programmable Gate Array (FPGA), Application Specific Integrated Circuit (ASIC), etc. In alternative embodiments, the decoder and reentry decoder may be implemented as software executed by a processor.

Preferred embodiments were described with respect to a data stream of concatenated planes of bit values compressed using an ABIC algorithm. However, those skilled in the art will recognize that the preferred embodiment technique for generating and using reentry data sets may be used to decode concatenated planes coded using compression algorithms other than ABIC, such as a Huffman coding, G4-MMR algorithm, etc. In alternative algorithms, such as the G4-MMR algorithm, only the last line of history bits are needed, as well as the pointer into the compressed data stream of where to start decoding.

Preferred embodiments were described with respect to using the reentry data sets to decode bit planes and also to decompress image areas in data streams compressed using a baseline JPEG algorithm. In further embodiments, the data stream being decompressed using the preferred embodiment reentry data sets may comprise of other types of image streams known in the art.

Preferred embodiments described information used by the decoder in the reentry data sets to decode from the location addressed by the pointer as N plus two previous bits, probability estimates and register values. However, the decoding information included with the reentry data sets may comprise any information the decoder needs in order to begin decoding from the point in the compressed data stream addressed by the pointer.

In preferred embodiments, the image data was expressed as individual values for each bit in a bit plane, such as described with respect to FIGS. 1A, 1B and 2. In alternative embodiments, the bit values in each plane may be expressed as transition points, such that each plane stores the points at which the bit values transition from 0 to 1 or 1 to 0. In such embodiments, the decoder would decode the transition points in a manner known in the art, and then generate lines of bit values for the decompressed transition points.

Preferred embodiments were described with respect to decompressing still image data comprised of bits. In alternative embodiments, the data stream subject to the decoding/decompression techniques of the preferred embodiments may comprise other types of data than still image data.

In preferred embodiments, the decoder would decode the same L number of lines from each plane before outputting the data. In further embodiments, the decoder may decode a different number of lines of data from each plane and then output reassembled lines of data for all planes for the same lines of bits. Thus, the decoder may not output all the decoded lines for each plane.

In preferred embodiments, the decoder would buffer lines of data from each plane, reassemble the lines from each plane, and then output the reassembled data from each plane. In alternative embodiments, the decoder may output data from less than all the buffers.

In preferred embodiments, the decoder reassembled and outputted the same lines of bit data from each plane. In alternative embodiments, the decoder may output from the plane buffers different lines of data or bits.

In preferred embodiments, the decoder decoded lines of data. In alternative embodiments, the decoder may decode less than all the bits in a line before proceeding to the next plane to decode bits.

Preferred embodiments were described with respect to four planes. However, in alternative embodiments, the concatenated data stream may include more or less than four planes. Still further, the decoding information may provide more or less than N plus two bits of history data. Yet further, the bit stream subject to decompression and reentry does not have to comprise concatenated planes The described implementations provided specific computing environments in which the decoder and reentry data sets may be used. Those skilled in the art will appreciate that the decoder and reentry data sets described herein may be used in various other computing environments where data is stored in a compressed format.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for transmitting data in a compressed format, comprising:

transmitting compressed data to a receiving device;

transmitting a reentry data set to the receiving device having a pointer to a location in the compressed data and decoding information that enables decoding to start from the location, wherein the receiving device is capable of using the decoding information in the reentry data set to decode the compressed data from the location addressed by the pointer in the reentry data set.

2. The method of claim 1, wherein the decoding information includes decoded data preceding output produced by decoding the compressed data at the location addressed by the pointer and probability estimates used to enable decoding the compressed data at the location addressed by the pointer.

3. The method of claim 1, wherein the compressed data is transmitted over a network.

4. The method of claim 1, further comprising:

receiving a request from the receiving system for a retransmission of a portion of the compressed data; and transmitting a block of the compressed data including the requested portion of the compressed data, wherein the pointer in one reentry data set addresses a beginning of the block of the compressed data and includes decoding information to decode the block of the compressed data.

5. The method of claim 4, wherein the block of the compressed data includes compressed data between locations addressed by pointers in two reentry data sets.

6. The method of claim 4, wherein the receiving device decodes the compressed data in parallel with receiving the data from the transmitting device.

7. The method of claim 6, further comprising:
transmitting the reentry data set having the pointer to the beginning location in the block of the compressed data in response to the request; and
transmitting reentry data sets with the compressed data after transmitting the block of compressed data, wherein before the request was received the reentry sets were not transmitted with the compressed data.

* * * * *